US012233659B2

(12) United States Patent
Duriez et al.

(10) Patent No.: US 12,233,659 B2
(45) Date of Patent: Feb. 25, 2025

(54) SECURITY DOCUMENT HAVING A PERSONALIZED IMAGE FORMED FROM A METAL HOLOGRAM AND METHOD FOR THE PRODUCTION THEREOF

(71) Applicant: IDEMIA FRANCE, Courbevoie (FR)

(72) Inventors: Christophe Duriez, Courbevoie (FR); Paul Azuelos, Courbevoie (FR)

(73) Assignee: IDEMIA FRANCE, Courbevoie (FR)

(*) Notice: Subject to any disclaimer, the term of this patent is extended or adjusted under 35 U.S.C. 154(b) by 451 days.

(21) Appl. No.: 17/779,738

(22) PCT Filed: Nov. 10, 2020

(86) PCT No.: PCT/FR2020/052053
§ 371 (c)(1),
(2) Date: May 25, 2022

(87) PCT Pub. No.: WO2021/105582
PCT Pub. Date: Jun. 3, 2021

(65) Prior Publication Data

US 2023/0024208 A1 Jan. 26, 2023

(30) Foreign Application Priority Data

Nov. 29, 2019 (FR) ...................................... 1913513

(51) Int. Cl.
*B32B 3/10* (2006.01)
*B42D 25/328* (2014.01)
(Continued)

(52) U.S. Cl.
CPC ......... *B42D 25/328* (2014.10); *B42D 25/346* (2014.10); *B42D 25/435* (2014.10)

(58) Field of Classification Search
None
See application file for complete search history.

(56) References Cited

U.S. PATENT DOCUMENTS 11,040,565 B2 * 6/2021 Rauch .................. B42D 25/435
11,110,734 B2 * 9/2021 Fuhse .................. B42D 25/435
(Continued)

FOREIGN PATENT DOCUMENTS

EP 1997643 A2 12/2008
EP 3279003 A 2/2018
(Continued)

OTHER PUBLICATIONS

English language abstract of EP1997643.
(Continued)

*Primary Examiner* — Christopher M Polley
(74) *Attorney, Agent, or Firm* — NIXON & VANDERHYE

(57) ABSTRACT

A secure document including a first layer having a metal holographic structure forming an arrangement of pixels each including a plurality of sub-pixels of distinct colors and a second layer positioned facing the first layer, the second layer being opaque to at least the visible wavelength spectrum. The first layer includes perforations formed by a first laser beam, the first perforations locally revealing through the holographic structure a number of dark areas in the sub-pixels caused by underlying regions of the second opaque layer such as to form a personalized image starting from the arrangement of pixels combined with the dark areas.

13 Claims, 8 Drawing Sheets

(51) Int. Cl.
*B42D 25/346* (2014.01)
*B42D 25/435* (2014.01)

(56) References Cited

U.S. PATENT DOCUMENTS

| | | | | |
|---|---|---|---|---|
| 2018/0361777 | A1* | 12/2018 | Fuhse .................. | B42D 25/435 |
| 2020/0215846 | A1 | 7/2020 | Ordung et al. | |

FOREIGN PATENT DOCUMENTS

| | | | |
|---|---|---|---|
| EP | 3521052 | A1 | 8/2019 |
| JP | 109311614 | A | 12/1997 |
| JP | 2005219296 | A | 8/2005 |
| JP | 2008142914 | A | 6/2008 |
| WO | 2019034398 | A1 | 2/2019 |

OTHER PUBLICATIONS

English language abstract of JP2008142914.
English language abstract of JPH09311614.
English language abstract of EP3279003.
English language abstract of JP2005219296.
English language abstract of EP3521052.

* cited by examiner

[Fig. 1]
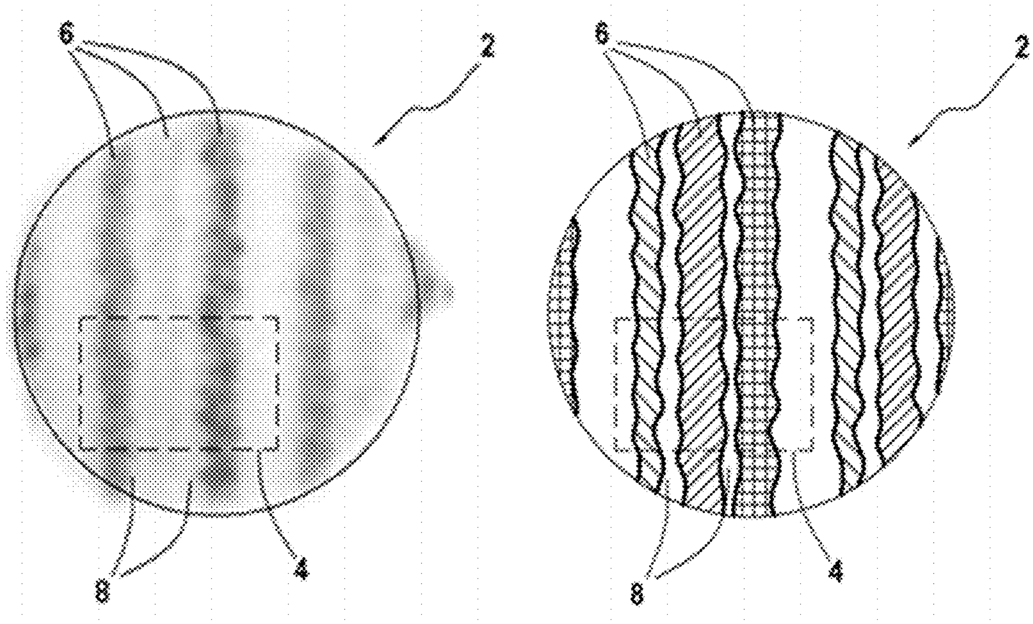
[Fig. 2]
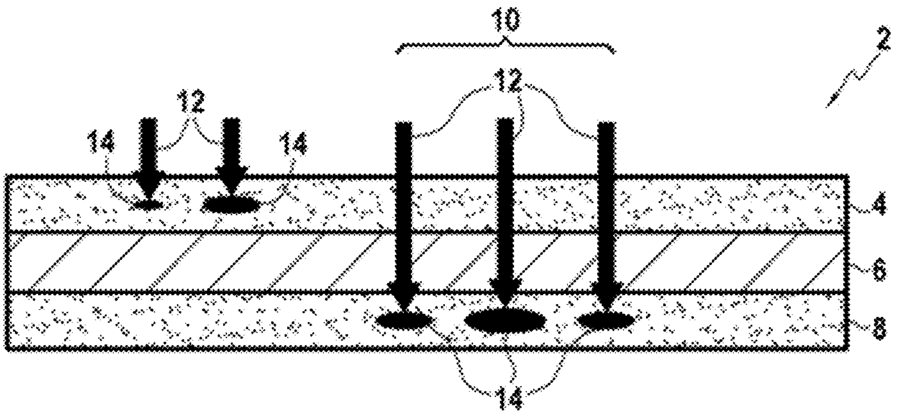

[Fig. 3]
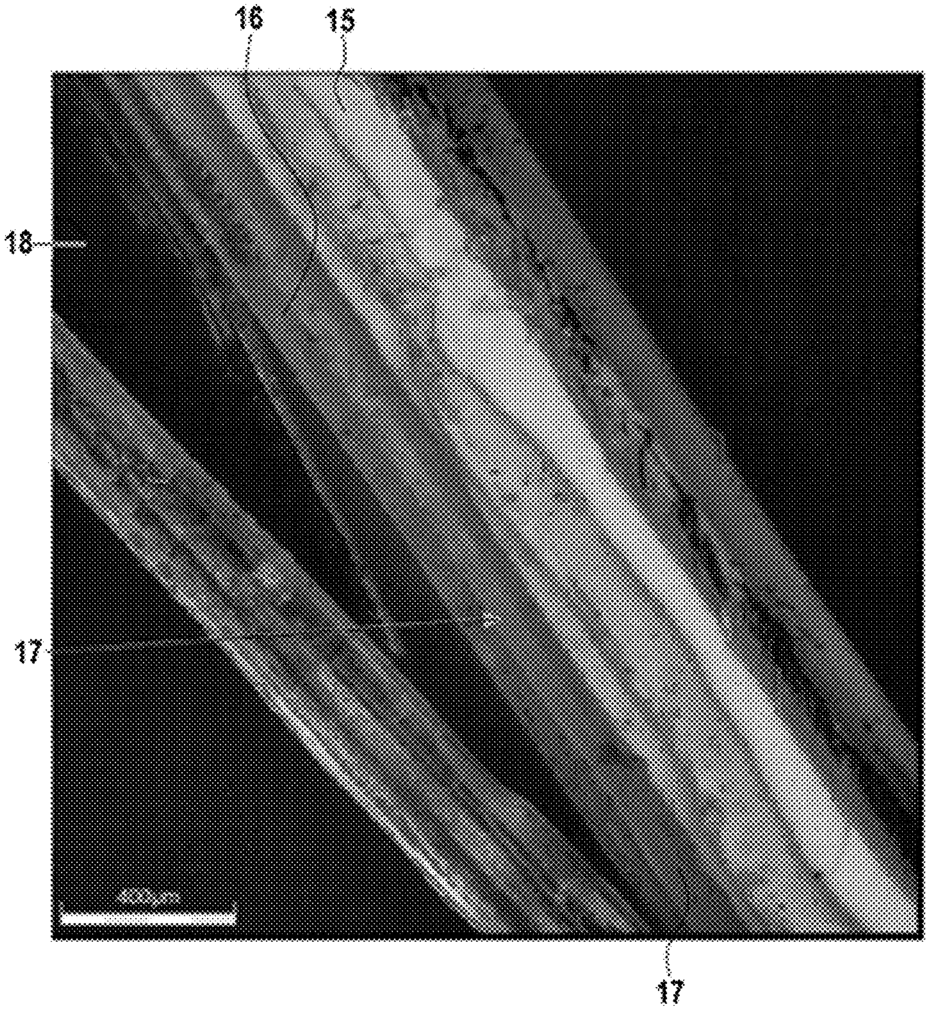
[Fig. 4]
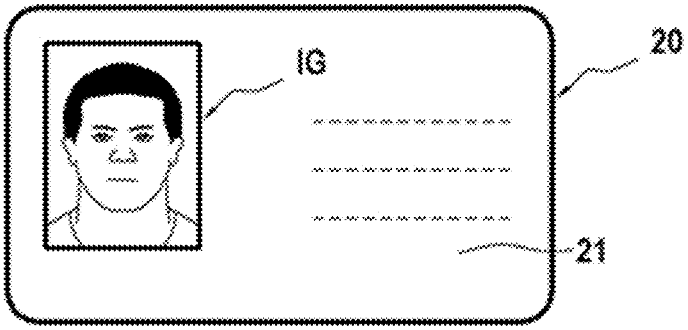

[Fig. 5]
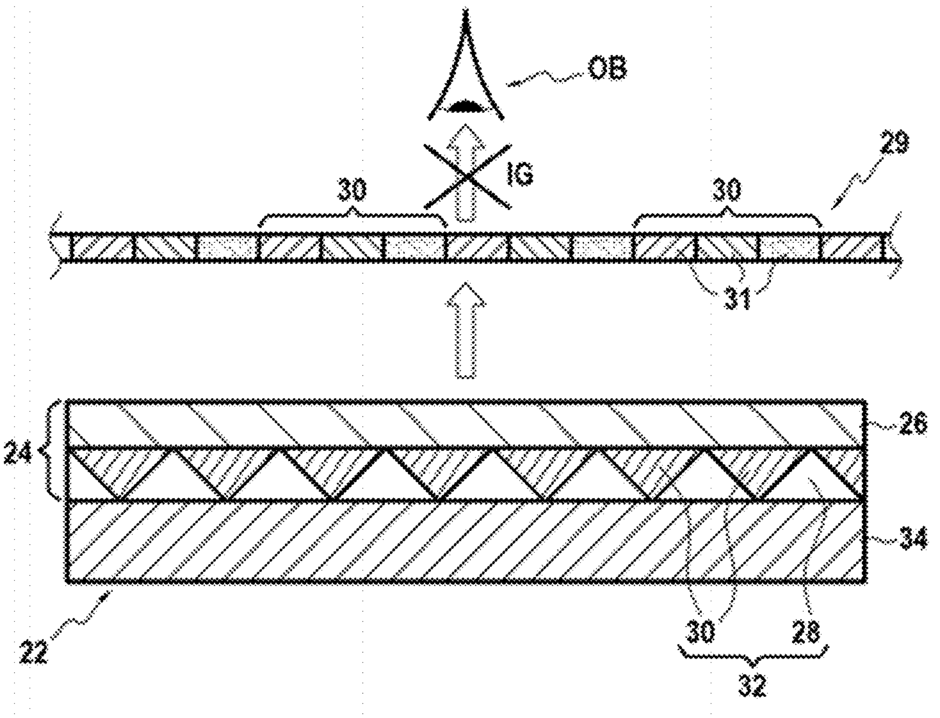
[Fig. 6]
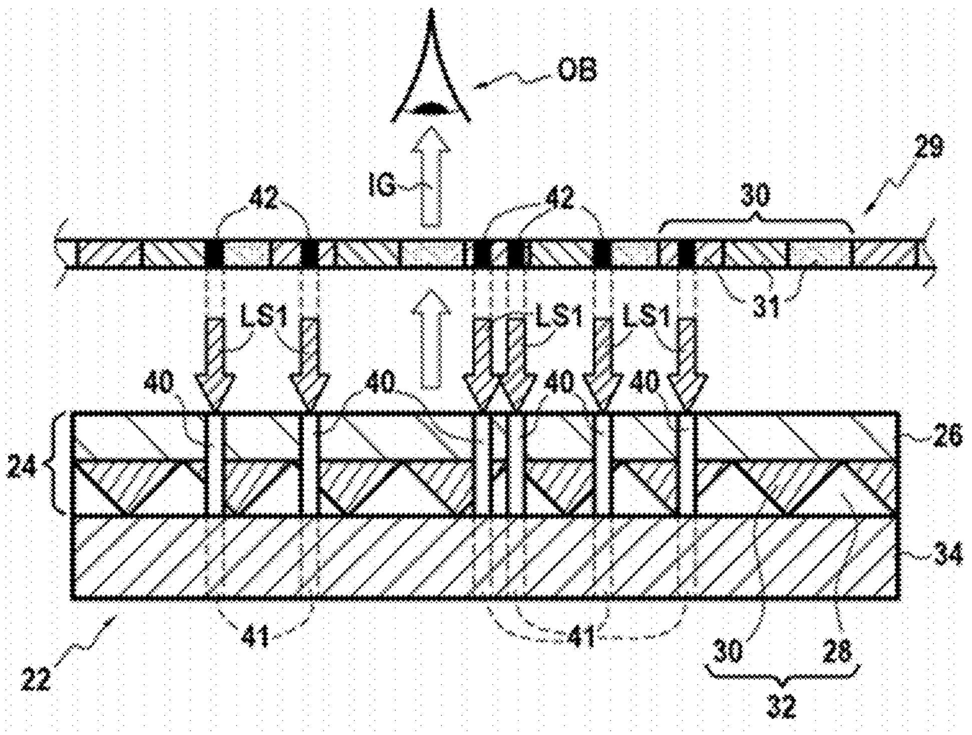

[Fig. 7]
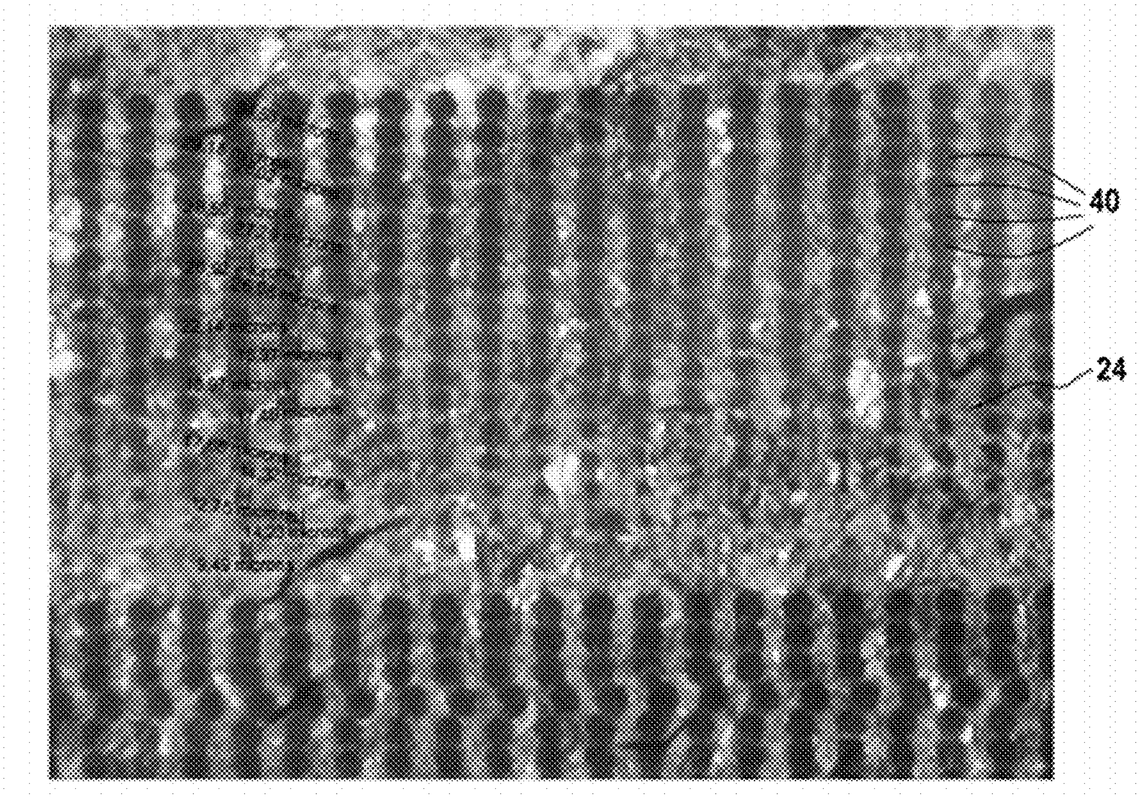
[Fig. 8]
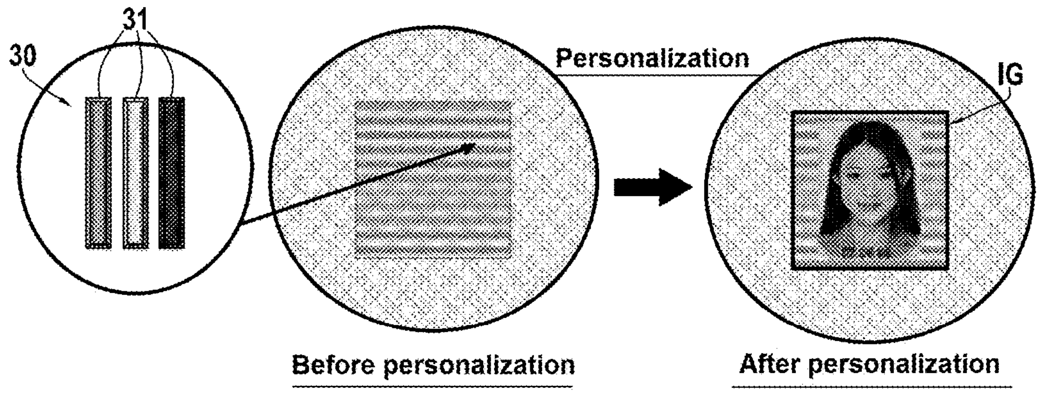

[Fig. 9A]
[Fig. 9B]
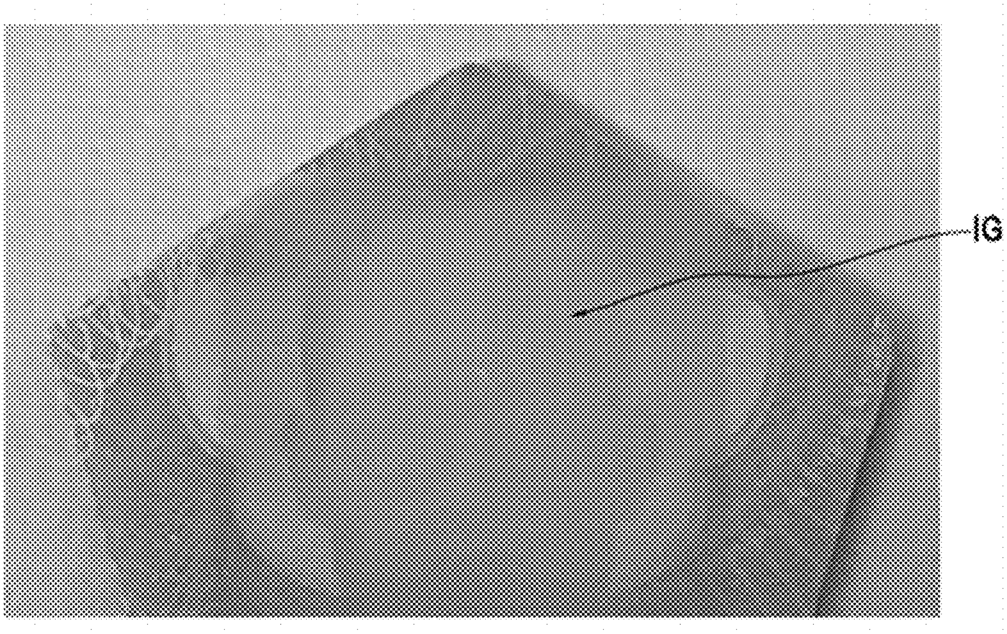

[Fig. 10]
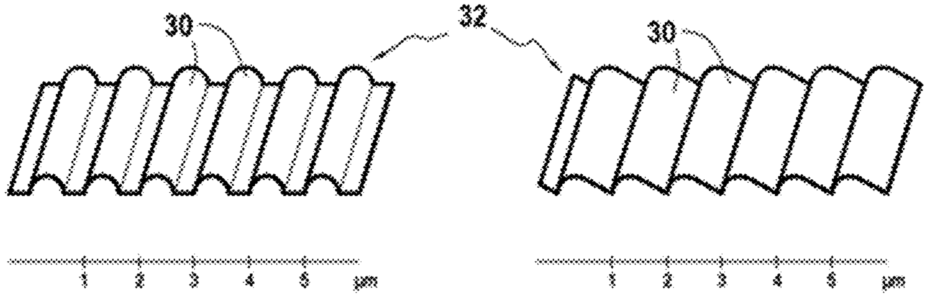
[Fig. 11A]
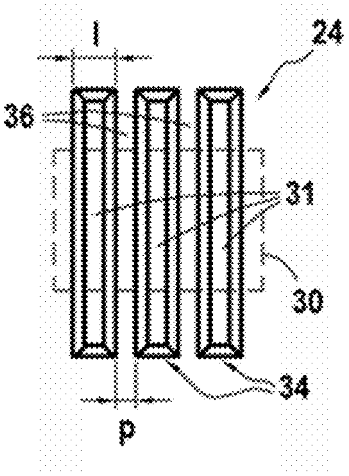
[Fig. 11B]
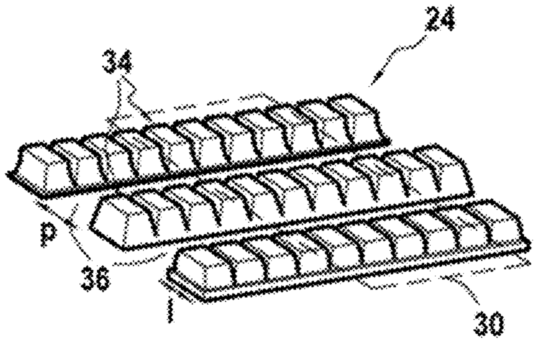

[Fig. 12A]
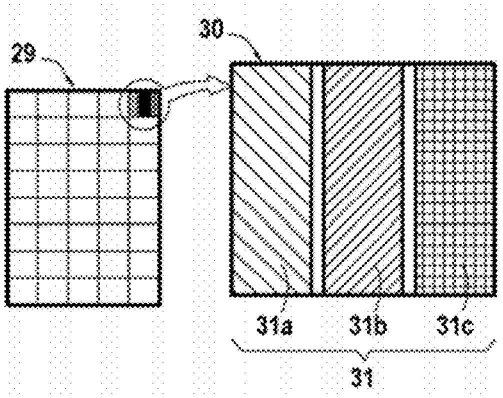
[Fig. 12B]
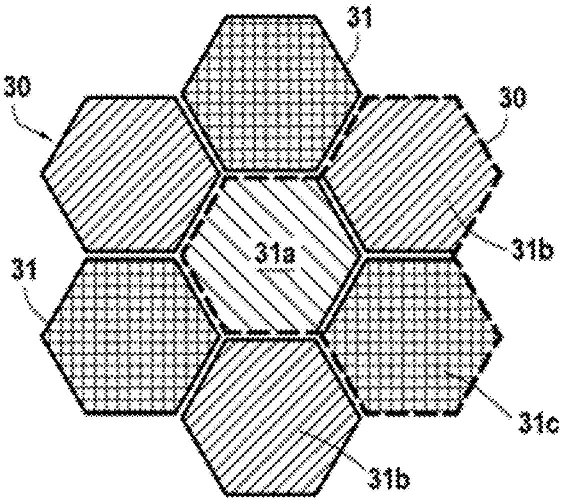
[Fig. 12C]
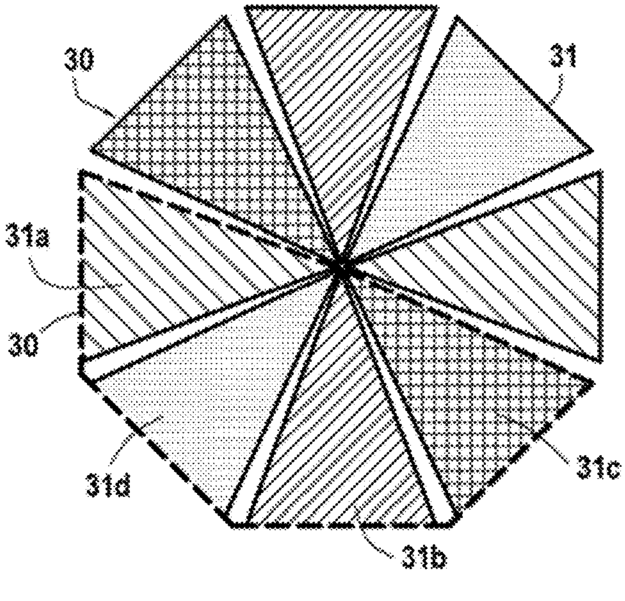

[Fig. 13]
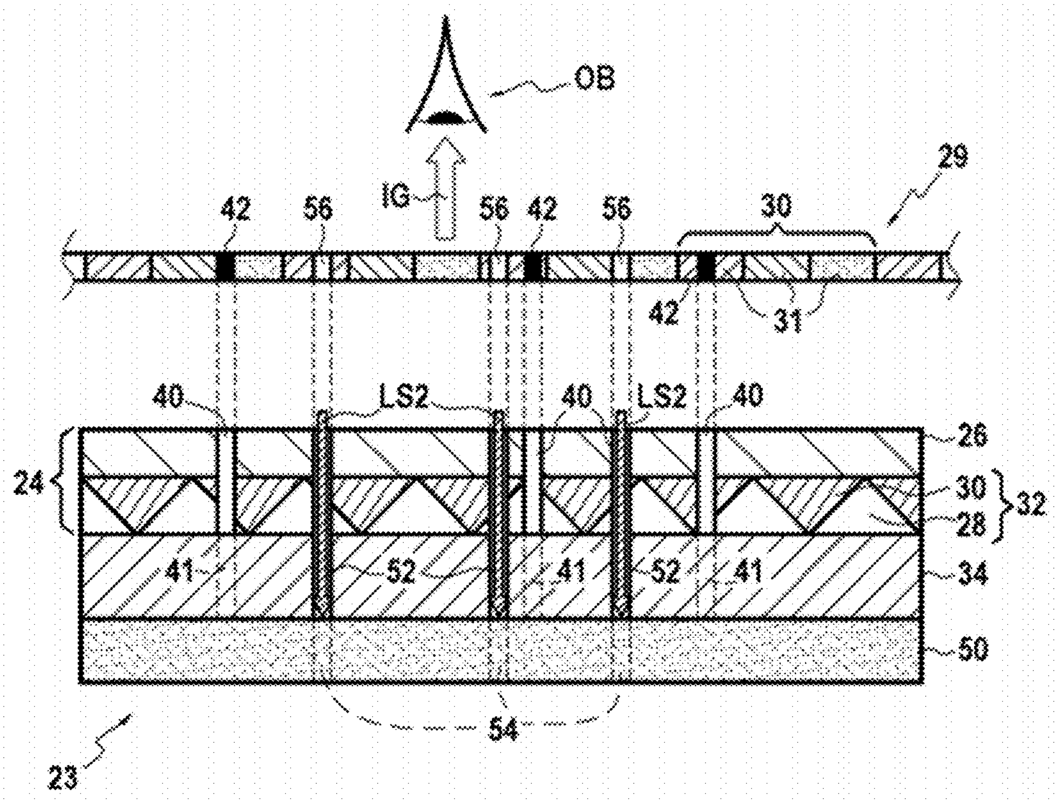
[Fig. 14]
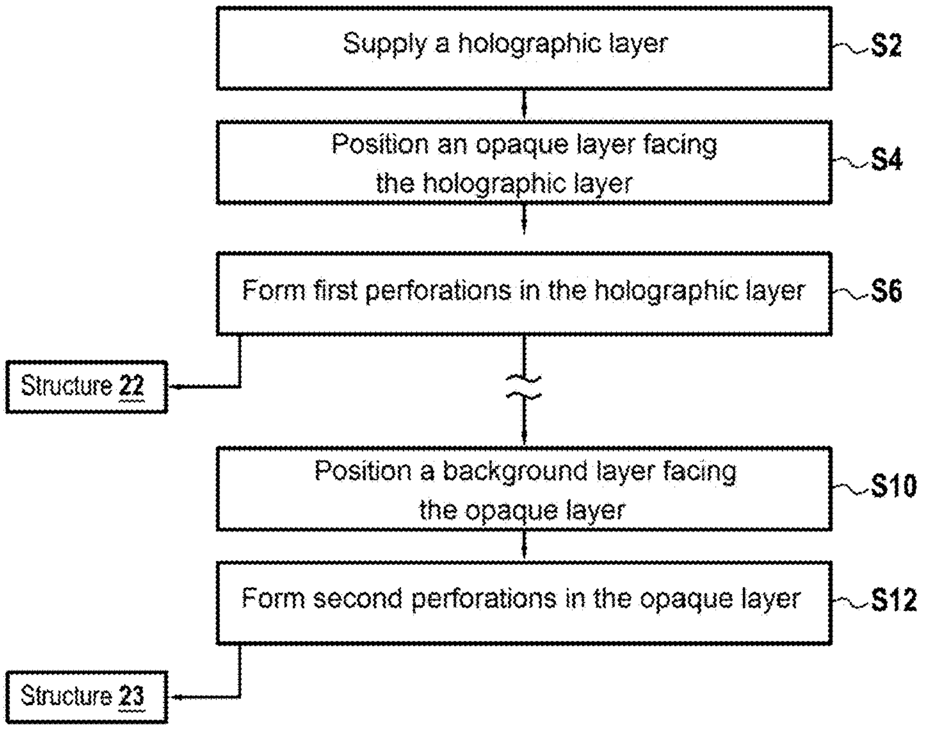

SECURITY DOCUMENT HAVING A PERSONALIZED IMAGE FORMED FROM A METAL HOLOGRAM AND METHOD FOR THE PRODUCTION THEREOF

TECHNICAL FIELD

The disclosure relates to a technique for forming color images and more specifically relates to a document including a holographic structure forming an arrangement of pixels on the basis of which a color image is formed.

BACKGROUND

At the present time the identity market requires increasingly secure identity documents (also known as ID documents). These documents must be easy to authenticate and difficult to counterfeit (if possible unfalsifiable). This market relates to a very wide variety of documents, such as identity cards, passports, access passes, driving licenses (cards, books etc.)

Various types of secure documents containing images have thus been developed over time, particularly to identify people securely. More and more passports, identity cards or other official documents now include security elements which are used to authenticate the document and limit the risks of fraud, falsification or counterfeiting. Electronic identity documents including a chip card, such as electronic passports for example, have undergone considerable expansion in recent years.

Over time various printing techniques have been developed to make color prints. In particular, the production of identity documents such as those mentioned above require the production of color images securely in order to limit the risks of falsification by malicious individuals. The manufacturing of such documents, in particular the identity image of the bearer, need to be sufficiently complex to make reproduction or falsification by an unauthorized individual difficult.

Thus, a known solution includes in printing on a backing a pixel matrix composed of color sub-pixels and forming shades of gray by laser carbonization on a laserable layer facing the pixel matrix, such as to reveal a personalized color image which is difficult to falsify or reproduce. Exemplary embodiments of this technique are described for example in documents EP 2 580 065 B1 (dated 6 Aug. 2014) and EP 2 681 053 B1 (dated 8 Apr. 2015).

Although this known technique offers good results, improvements are still possible, particularly in terms of the quality of the visual rendering of the image thus formed. This is because it is difficult to achieve high levels of color saturation using this image-forming technique. In other words, the color gamut (ability to reproduce a range of colors) of this known technique can prove limited, which can be a problem in some use cases. This results in particular from the fact that the color sub-pixels are formed by a conventional printing method, by "offset"-type printing for example, which does not allow the formation of sufficiently straight and continuous rows of pixels, which gives rise to homogeneity defects when printing the sub-pixels (interruptions in the pixel rows, uneven outlines etc.) and a degraded colorimetric rendering.

Current printing techniques also offer limited positioning accuracy due to the inaccuracy of printing machines, which also reduces the quality of the final image due to poor positioning of the pixels and sub-pixels with respect to one another (problems of pixel overlap, misalignments etc.) or due to the presence of an unprinted tolerance interval between the sub-pixels.

FIG. 1 represents an example of printing 2 by pixel offset 4 taking the form of rows 6 of sub-pixels of distinct colors. As shown, the contours of each row 6 of sub-pixels have irregularities. A tolerance must be included when positioning these rows due to the positioning inaccuracies during printing.

As illustrated in FIG. 1, to compensate for these defects of uniformity and positioning of the sub-pixels of each pixel (and thus avoid any overlaps of neighboring pixels and the degradation of the desired colors), it is possible to print the sub-pixels such as to retain a white area 8 between them. This technique of adding white areas does however have a drawback in that it limits the level of saturation that it is likely to obtain for a given color, which prevents a satisfactory gamut of colors from being obtained.

At present there is a need to securely form personalized images (color or black and white), particularly in documents such as identity documents, official documents or other documents. There is in particular a need for flexible and secure personalization of color images, in such a way that the image thus produced is difficult to falsify or reproduce and can be easily authenticated.

At present no solution able to offer an appropriate level of security and flexibility also makes it possible to obtain a good level of image luminosity along with an adequate color gamut, and in particular to obtain the color shades needed to form certain high-quality color images, for example when image areas must have a highly-saturated level in a given color.

SUMMARY

In view of the problems and inadequacies mentioned above, it has been envisioned to form a color image by disposing a holographic structure forming an arrangement of color pixels on a laserable layer, and by producing gray shades in the arrangement of pixels by forming areas opaque to the laser in the laserable layer.

FIG. 2 thus represents, according to a particular example, a structure 2 including a stack formed by a holographic layer 6 interposed between a first laserable transparent layer 4 and a second laserable transparent layer 8. In a variant, the structure 2 can include only one from among the two laserable layers 4 and 8.

In this example, the holographic layer 4 includes a holographic metal structure forming an arrangement of color pixels by holographic effect. Furthermore, the transparent layers 4 and 8 are sensitive to the laser in the sense that they can be locally opacified by carbonization by means of a laser beam 12 in order to at least partially block the passage of light. The laserable layers 4 and 8 thus include areas (or volumes) 14, so-called "opaque areas", which are locally opacified by the laser beam 12, these opaque areas being positioned facing the holographic structure such as to mask certain parts of the pixels and thus produce gray shades to reveal a personalized color image 10.

By altering the power delivered by the laser 12, opaque areas 14 of the desired size can thus be formed at particular positions in the pixel arrangement in order to create the personalized image 10.

This technique advantageously makes it possible to create color shades in such a way as to form a secure color image by the interaction between the opaque areas and the arrangement of pixels formed by the holographic layer. It is thus possible to form color images having satisfactory image quality while being secure and therefore resistant to falsification and fraudulent reproductions.

However, it has been observed that structural defects occur during the manufacturing of such structures including a metal holographic layer face-to-face with a locally opacified laserable layer. Specifically, air bubbles form within the structure during the laser carbonization of the laserable layer, causing debonding in the stack and a destruction of the holographic structure in the surrounding area.

By way of example, FIG. 3 is a section view of a structure 15 including a metal holographic layer 16 positioned facing a laserable transparent layer 17 (made of polycarbonate). As can be seen, an air bubble 18 has formed within the structure 15 during its manufacturing, causing irreversible damage.

An in-depth study has determined that the formation of these air bubbles (known as the "blistering" effect) is caused by the projection of the laser to form the opaque areas in the laserable layer. Specifically, the power delivered by the laser beam generates heating in the metal holographic structure giving rise to these air bubbles and thus causing the irreversible destruction of the holographic structure.

In order to form a secure color image having good contrast and good image quality while palliating the problems and deficiencies mentioned above, a new image-forming technique has therefore been developed.

For this purpose the disclosure concerns a secure document including:

- a first layer including a metal holographic structure forming an arrangement of pixels each including a plurality of sub-pixels of distinct colors;
- a second layer positioned facing the first layer, the so-called second layer being opaque to at least the visible wavelength spectrum;
- wherein the first layer includes first perforations formed by a first laser beam, at least a first part of the first perforations locally revealing through the holographic structure a number of dark areas in the sub-pixels caused by underlying regions of the second opaque layer located facing said at least a first part of the first perforations, such as to form a personalized image starting from the arrangement of pixels combined with the dark areas.

The disclosure advantageously makes it possible to form a personalized image, in color or black and white, of good quality (in particular with good contrast), easy to authenticate, robust as regards the risks of fraud, falsification or counterfeiting. This is in particular possible in the disclosure, which makes it possible to avoid using a laserable layer requiring laser carbonization which, as already described, can generate air bubbles (blistering) and therefore cause the destruction or irreversible damage to the structure. By forming a personalized image with no laserable layer, one can avoid applying a powerful laser to the structure and thus preserve its integrity.

According to a particular embodiment, each pixel of said arrangement of pixels is configured such that each sub-pixel has a single color in said pixel.

According to a particular embodiment, the first layer includes:

- a resin underlayer forming the reliefs of a holographic array; and
- a metal underlayer deposited on the reliefs of the resin underlayer, said metal underlayer having a refractive index greater than that of the resin underlayer.

According to a particular embodiment, the second opaque layer includes an opaque black surface facing the first layer or includes opacifying black pigments in its bulk.

According to a particular embodiment, the first laser beam is at a first wavelength spectrum different from the visible wavelength spectrum.

According to a particular embodiment, said at least a first part of the first perforations are through perforations which extend through the thickness of the holographic structure such as to reveal said underlying regions of the second opaque layer.

According to a particular embodiment, the secure document includes a third layer located facing the second layer such that said second layer is interposed between the first layer and the third layer,

- said third layer being transparent or of lighter color than the second opaque layer, and forming a background for the personalized image,
- wherein the second layer includes second perforations formed by a second laser beam different from the first laser beam, the second perforations being positioned in the extension of a second part of the first perforations such that the first and second perforations located face-to-face locally reveal through the holographic structure and through the second opaque layer a number of lightened areas in the sub-pixels caused by underlying regions of the third layer located facing said second perforations, thus forming a personalized image starting from the arrangement of pixels combined with the dark areas and with the lightened areas.

According to a particular embodiment, the second perforations are through perforations which extend through the thickness of the second layer such as to reveal, jointly with the second part, first perforations located face-to-face, said underlying regions of the third opaque layer through first and second layers.

According to a particular embodiment, the lightened areas are areas brighter than the dark areas.

The disclosure also relates to a corresponding manufacturing method. More specifically, the disclosure relates to a method for manufacturing a document, including:

- supplying a first layer including a metal holographic structure forming an arrangement of pixels each including a plurality of sub-pixels of distinct colors;
- positioning a second layer facing the first layer, said second layer being opaque to at least the visible wavelength spectrum, and
- forming, in the first layer, first perforations, by a first laser beam, at least a first part of the first perforations locally revealing through the holographic structure a number of dark areas in the sub-pixels caused by underlying regions of the second opaque layer located facing said at least a first part of the first perforations, such as to form a personalized image starting from the arrangement of pixels combined with the dark areas.

According to a particular embodiment, the first laser beam is at a first wavelength spectrum different from the visible wavelength spectrum.

According to a particular embodiment, the manufacturing method includes:

- positioning a third layer facing the second layer such that said second layer is interposed between the first layer and the third layer, said third layer being transparent or of lighter color than the second opaque layer, and forming a background for the personalized image,
- forming, in the second layer, second perforations by a second laser beam different from the first laser beam, the second perforations being positioned in the extension of a second part of the first perforations such that the first and second perforations located face-to-face locally reveal through the holographic structure and through the second opaque layer a number of lightened areas in the sub-pixels, caused by underlying regions of the third layer located facing said second perforations, thus forming a personalized image starting from the arrangement of pixels combined with the dark areas and with the lightened areas.

According to a particular embodiment, the third layer is transparent to the first and second laser beams.

BRIEF DESCRIPTION OF THE DRAWINGS

FIG. 1, already described above, schematically represents the printing of rows of color sub-pixels on a backing.

FIG. 2, already described above, schematically represents a known structure for forming a personalized image;

FIG. 3, already described above, represents defects occurring in known structures during the manufacturing of an image;

FIG. 4 schematically represents a secure document including a personalized image, according to a particular embodiment of the disclosure;

FIG. 5 is a section view schematically representing a multilayer structure in an initial state, according to a particular embodiment of the disclosure;

FIG. 6 is a section view schematically representing a multilayer structure forming a personalized image, according to a particular embodiment of the disclosure;

FIG. 7 represents first perforations made in the holographic layer of a multilayer structure, according to a particular embodiment of the disclosure;

FIG. 8 schematically represents a multilayer structure before personalization and after personalization, according to a particular embodiment of the disclosure;

FIGS. 9A and 9B respectively represent an image formed by a multilayer structure with no opaque layer and an image formed by a multilayer structure provided with an opaque layer, according to a particular embodiment of the disclosure;

FIG. 10 schematically represents the reliefs of a holographic structure, according to a particular embodiment of the disclosure;

FIGS. 11A and 11*b* schematically represent an arrangement of pixels and sub-pixels, according to a particular embodiment of the disclosure;

FIGS. 12A, 12B and 12C schematically represent arrangements of pixels and sub-pixels, according to particular embodiments of the disclosure;

FIG. 13 is a section view schematically representing a multilayer structure forming a personalized image, according to a particular embodiment of the disclosure; and FIG. 14 schematically represents a manufacturing method according to a particular embodiment of the disclosure.

DESCRIPTION

As previously indicated, the disclosure generally pertains to the formation of a color image and in particular relates to a secure document including such an image.

The disclosure proposes to form a color image securely starting from a metal holographic layer forming an arrangement of pixels and an opaque layer located facing the metal holographic layer. The metal holographic layer includes perforations (or holes) locally revealing dark (opaque, non-reflective) areas in the arrangement of pixels caused by (corresponding) underlying regions of the opaque layer located facing the perforations, such as to form a personalized image starting from the arrangement of pixels combined with the dark areas.

The disclosure in particular relates to a secure document including a first layer including a metal holographic structure forming an arrangement of pixels each including a plurality of sub-pixels of distinct colors; and a second layer positioned facing the first layer. This second layer is opaque as regards at least the visible wavelength spectrum. The first layer includes perforations formed by a first laser beam (or laser etching), these perforations (or at least a part of them) locally revealing through the holographic structure a number of dark (or black) areas in the sub-pixels caused by (corresponding) underlying regions of the second opaque layer located facing the perforations, such as to form a personalized image starting from the arrangement of pixels combined with the dark areas.

As explained hereinafter, it is thus possible to form a personalized image, either color or black and white, which is of good quality (in particular with good contrast), easy to authenticate, robust as regards the risk of fraud, falsification or counterfeiting while avoiding the use of a laserable layer requiring laser carbonization which, as already described, can give rise to air bubbles (blistering) and therefore cause the destruction of or irreversible damage to the structure. By forming a personalized image with no laserable layer, one can avoid applying a powerful laser to the structure and thus preserve its integrity.

The disclosure also relates to a method for forming such a personalized image.

Other features and advantages of this disclosure will become apparent from the exemplary embodiments described below with reference to the drawings mentioned above.

In the remainder of this document, exemplary embodiments of the disclosure will be described for the case of a document including a color image according to the principle of the disclosure. This document may be any document, a so-called secure document, of book, card, or other type. The disclosure has particular applications in the formation of identity images in ID documents such as: identity cards, credit cards, passports, driving licenses, security passes etc. The disclosure is also applicable to security documents (banknotes, notarized documents, official certificates etc.) including at least one color image.

In general, the image according to the disclosure can be formed on any appropriate backing.

In the same way, the exemplary embodiments described hereinafter concern the formation of an identity image. It will however be understood that the color image in question can be of any kind. It can for example be an image showing the portrait of the holder of the document in question, other implementations being nonetheless possible.

Unless otherwise specified, items that are common or similar across several figures bear the same reference signs and have identical or similar features, such that these common items will generally not be described again for the sake of simplicity.

As already indicated, the color image IG may be formed on any backing. FIG. 4 represents, according to a particular embodiment, a secure document 20 including a document body 21 in or on which is formed a secure image IG according to the concept of the disclosure.

It is assumed in the following exemplary embodiments that the secure document 20 is an ID document, for example taking the form of a card, such as an identity card, identification pass or another form. In these examples, the image IG is a color image, the pattern of which corresponds to the portrait of the holder of the document. As already mentioned, other examples are nonetheless possible.

FIG. 5 represents a multilayer structure 22 in an initial (blank) state, from which a personalized color image IG can be formed as represented in FIG. 4. As explained further on with reference to FIG. 6, this structure 22 can be personalized to form a personalized image IG.

As illustrated in FIG. 5, the structure 22 includes a holographic layer 24 (also known as the "first layer") and an opaque layer 34 (also known as the "second layer") positioned facing the holographic layer 24. In this example the holographic layer 24 is disposed on the opaque layer 34, although variants are possible wherein one or more intermediate layers are present at the interface between the holographic layer 24 and the opaque layer 34.

In a variant, the opaque layer 34 is spaced apart from the holographic layer by a transparent layer. The establishment of a space between the opaque layer and the holographic layer can in particular make it possible to obtain a color variation effect in the final image in the specific situation in which the opaque layer is also perforated or etched by laser as described further on (FIGS. 13-14).

The holographic layer 24 includes a metal holographic structure 32 forming an arrangement 29 of pixels 30, each of these pixels 30 including a plurality of sub-pixels 31 of distinct colors.

More particularly, the holographic structure 32 intrinsically forms an arrangement 29 of pixels which is blank, in the sense that the pixels 30 do not include the information defining the pattern of the color image IG that one wishes to form. As will be described further on, it is by combining this arrangement 29 of pixels with dark areas (illustrated in FIG. 6) that a pattern of the personalized color image IG is revealed.

The holographic structure 32 produces the arrangement 29 of pixels 30 in the form of a hologram by diffraction, refraction and/or reflection of incident light. The principle of the hologram is well-known to those skilled in the art. A reminder of certain items will be provided hereinafter for reference purposes. Exemplary embodiments of holographic structures are for example described in the document EP 2 567 270 B1.

As represented in FIG. 5, the holographic layer 24 includes a layer (or underlayer) 26 as well as reliefs (or relief structures) 30, containing a three-dimensional item of information, which are formed on the basis of the layer 26 serving as the backing. These reliefs 30 form projecting portions (also known as "mounds") separated by recesses (also called "valleys").

The holographic layer 22 further includes a so-called "high-refractive-index" layer (or underlayer) 28, which has a refractive index n2 greater than the refractive index n1 of the reliefs 30 (it is assumed here that the reliefs 30 are an integral part of the layer 26 serving as the backing, such that the reliefs 30 and the layer 26 have the same refractive index n1). It is here considered that this high-refractive-index layer 28 is a metal layer covering the reliefs 30 of the holographic layer 24. As will be understood by those skilled in the art, the reliefs 30 form in combination with the layer 28 a holographic structure 32 which produces a hologram (i.e. a holographic effect).

The reliefs 30 of the holographic structure 32 can be formed for example by embossing a layer of stamping resin (included in the layer 26 in this example) in a known manner to produce diffractive structures. The stamped surface of the reliefs 30 thus has the shape of a periodic array, the depth and period of which can be respectively in the order of a hundred to a few hundred nanometers for example. This stamped surface is coated with the layer 34, for example by means of a vacuum deposition of a metallic material. The holographic effect results from the association of the reliefs 30 and of the layer 28 forming the holographic structure 32.

The holographic layer 24 can where applicable include other underlayers (not shown) needed to maintain the optical features of the hologram and/or ensuring the mechanical and chemical resistance of the whole.

The high-refractive-index metal layer 28 (FIG. 5) may include at least one of the following materials: aluminum, silver, copper, zinc sulfide, titanium oxide etc.

In the exemplary embodiments described in this document, the holographic layer 24 is transparent, such that the holographic effect producing the arrangement 29 of pixels 30 is visible by diffraction, reflection and refraction.

The holographic structure 32 is made by any appropriate method known to those skilled in the art.

The reliefs 30 have a refractive index denoted n1, in the order of 1.56 at a wavelength $\lambda$=656 nm for example.

In the example under consideration here (FIG. 5), the layer 26 is a layer of transparent resin. The holographic structure 32 is coated with a thin film 28, for example made of aluminum or of zinc sulfide, having a high refractive index n2 (in relation to n1), for example of 2.346 at a wavelength $\lambda$=660 nm for zinc sulfide. The thin film 28 for example has a thickness between 30 and 200 nm.

The layer 26 can be a heat-formable layer thus allowing the reliefs 30 of the holographic structure 32 to be formed by embossing on the layer 26 serving as the backing. In a variant, the reliefs 30 of the holographic structure 32 can be produced using an ultraviolet curing technique (UV). These manufacturing techniques being known to those skilled in the art, they will not be described in further detail for the sake of simplicity.

Still with reference to FIG. 5, the second layer 34 positioned with regard to the holographic layer 24 is opaque (non-reflective) as regards at least the visible wavelength spectrum. In other words, the second layer 34 absorbs at least the wavelengths in the visible spectrum. It is for example a dark layer (black for example). It is considered in this document that the visible spectrum is approximately between 400 and 800 nanometers (nm), or more precisely between 380 and 780 nm in a vacuum. Note that this second layer 34 can however be transparent to other wavelengths, particularly to infrareds.

According to a particular example, the opaque layer 34 is such that the density of black of the secure image IG formed in the secure document 20 (FIG. 4), particularly starting from said opaque layer, is greater than the intrinsic density of black of the holographic layer 24 without (independently of) the opaque layer 34. As is well-known to those skilled in the art, the density of black is measurable by means of an appropriate measuring device (for example, a colorimeter or a spectrometer).

According to a particular example, the opaque layer 34 includes an opaque black surface facing the holographic layer 24 and/or includes black or opacifying black (or dark) pigments in its bulk. The opaque layer 34 may in particular include a black ink, or else a material dyed in its bulk with black or opacifying (or dark) pigments.

As indicated above, the holographic structure 32 intrinsically forms an arrangement 29 of pixels which is blank. insofar as the pixels 30 do not include the information defining the pattern of the color image IG that one wishes to form. In the initial state (before personalization) represented in FIG. 5, the structure 22 therefore does not form any personalized image IG. As represented in FIG. 6 in a particular embodiment, it is possible to personalize the multilayer structure by combining the arrangement 29 of pixels with dark areas such as to reveal a pattern of the personalized image IG that one wishes to create.

More precisely, as shown in FIG. 6, the holographic layer 24 of the multilayer structure 22 further includes perforations (or holes) 40 formed by a first laser beam LS1 (or laser etching). The perforations 40 constitute "first perforations" within the meaning of the disclosure. As explained further on, other types of perforation can also be made, according to a particular embodiment.

The first perforations 40 constitute regions wherein the holographic layer 24 is destroyed or eliminated by the perforation effect of the laser.

These perforations 40 (or at least a part of them as explained below) reveal locally, through the holographic structure 32, dark areas (opaque, non-reflective) 42 in the sub-pixels 31 caused by (corresponding) underlying regions 41 of the opaque layer 34 located facing the perforations 40, such as to form a personalized color image IG on the basis of the arrangement 29 of pixels 30 combined with the dark areas 42.

In the example shown in FIG. 6, the perforations 40 are through perforations which extend through the thickness of the holographic structure 32 (and more generally through the thickness of the holographic layer 24) such as to reveal underlying regions 40 of the opaque layer 34 at the level of the arrangement 29 of pixels 30. In other words, by making these perforations 40 with the laser in the thickness of the holographic layer 24, it is possible to uncover underlying regions 41 of the opaque layer 34 such as to produce dark (or opaque) areas 42 in all or part of the sub-pixels 31.

Thus, the perforations 40 occupy all or part of a plurality of sub-pixels 31 of the holographic structure 32. The opaque nature of the second layer 34 then generates dark (or opaque) areas 42 in the perforated parts of the sub-pixels 31.

To do this, the perforations 40 can have various shapes and dimensions which can vary according to the case.

More specifically, the perforations 40 are arranged such as to select the color of the pixels 30 by modifying the colorimetric contribution of the sub-pixels 31 with respect to one another in at least a part of the pixels 30 formed by the holographic layer 24, such as to reveal the personalized image IG on the basis of the arrangement 29 of pixels combined dark areas 42.

Laser perforation in the holographic layer 24 causes the local removal (or deformation) of the geometry of the holographic structure 32, and more particularly of the reliefs 30 and/or of the layer 28 covering said reliefs. These local destructions lead to a modification of the behavior of the light (i.e. the reflection, diffraction, transmission and/or refraction of the light) in the corresponding pixels and sub-pixels.

By locally destroying by perforation all or part of the sub-pixels 31 and by revealing, instead, dark or opaque parts of the opaque layer 34, gray shades (or shades of colors) are generated in the pixels 30 by modifying the colorimetric composition of certain sub-pixels, with respect to one another, in the visual rendering of the final image IG. The creation of the dark areas 42 in particular makes it possible to modulate the passage of the light such that, for at least a part of the pixels 30, one sub-pixel or more has a colorimetric contribution (or a weight) that is increased or reduced with respect to that of at least one other neighboring sub-pixel of the pixel in question.

In particular, the selective description, partial or total, of one or of a plurality of sub-pixels 31 in at least a part of the pixels 30, generates a modification of the holographic effect in the regions in question. The holographic effect is eliminated, or reduced, in the perforated regions of the holographic structure 27, which decreases (or even totally eliminates) the relative color contribution of the sub-pixels 31 that are at least partly perforated with respect to at least one another neighboring sub-pixel 31 of the pixels 30 in question.

It is assumed here that the image IG thus created is a color image resulting from a selective modulation of the colorimetric contributions of color sub-pixels 31. Note however that one can make a personalized image IG in grayscale in the same way, for example by adapting the colors of the sub-pixels 31 accordingly.

The laser beam LS1 (also known as "first laser beam") used to form the perforations (or holes) 40 in the holographic structure 32 may be at a first wavelength spectrum SP1 different from the visible wavelength spectrum. To do so, it is possible, for example, to use a YAG laser (for example at a wavelength of 1064 nm), a blue laser, a UV laser, etc. It is moreover possible to apply for example a pulse frequency between 1 kHz and 100 kHz, although other configurations can be envisioned. It is up to those skilled in the art to choose the configuration of the laser beam LS1 according to the situation.

Furthermore, it is necessary that the holographic layer 24 (and more specifically the holographic structure 32) at least partly absorbs the energy delivered by the laser beam LS1 to create the perforations 40 previously described. In other words, the first laser beam LS1 is characterized by a wavelength spectrum SP1 which is at least partly absorbed by the holographic structure 32. The materials of the holographic layer 24 are chosen accordingly.

According to a particular example, the materials forming the holographic structure 32 are selected such that they do not absorb light in the visible spectrum. In this way, it is possible to create perforations 40 by means of a laser beam emitting outside the visible spectrum, and to generate a personalized image IG which is visible to the human eye by holographic effect. Examples of materials are described below (transparent polycarbonate, PVC, transparent glue etc.)

However, the spectrum SP1 may be chosen such that the ray LS1 is not absorbed by the opaque layer 34.

Additional layers (not shown), made of polycarbonate or any other appropriate material may furthermore more applied on either side of the multilayer structure 22, particularly to protect the assembly. In particular, a transparent layer can thus be applied to the upper face of the holographic layer 24.

In general, the disclosure advantageously makes it possible to create shades of color such as to form a color image secured by the interaction between the uncovered opaque areas of the opaque layer and the arrangement of pixels formed by the holographic layer. Without the appearance of these opaque areas by perforation as described above to orient or carefully select the passage of the incident light, the pixels form only a blank arrangement insofar as this assembly is devoid of the information characterizing the color image. It is the perforations 40 which are configured, according to the chosen arrangement of sub-pixels, to personalize the visual appearance of the pixels and thus reveal the final color image.

By thus using an opaque layer to generate shades of gray or color, a personalized image can be formed that is secure and has good image quality (in particular good contrast), while avoiding the use of a laserable layer which, as previously explained, is a source of structural defects (blistering problems) during the personalization of the structure. This technique thus makes it possible to dispense with the use of one or more laserable layers.

As previously explained, the laser carbonization of a laserable layer in a multilayer structure to create opacified areas requires the delivery of high power to the structure, causing the consequences of significant heating and the formation of air bubbles which are destructive, particularly for the metal holographic structure. Owing to the disclosure, it is possible to use laser beams of lower power, or at least to apply lower laser power than would risk generating such air bubbles. By working at reduced laser power, the physical integrity of the metal holographic structure is preserved.

According to a particular example, the perforations 40 are formed by projecting the first laser beam LS1 onto the holographic layer 24 at a power lower or equal than a first threshold value beyond which the blistering effect previously described is able to produce, which makes it possible to ensure that no air bubbles are generated liable to damage the structure 22. This first lower power threshold value is however variable and depends on each use case (particularly depends on the types of holographic and the features of the laser used). This first value can be determined by those skilled in the art, particularly by an appropriate experimental design which makes it possible to determine the laser power above which the laser gives rise to destruction of the structure (appearance of bubbles).

Advantageously, it is possible to finely configure the size of the holes 40 made by the laser in the hologram in order to produce a personalized image IG of good quality.

Furthermore, the use of reduced laser power makes it possible to increase the lifetime of the lasers used and therefore to reduce the manufacturing costs. The use of non-laser-sensitive materials (i.e. which do not have the ability to locally opacify under the effect of a laser) also makes it possible to limit manufacturing costs.

The use of holographic layer makes it possible to obtain increased image quality, namely better overall luminosity of the final image (more brightness, more vivid colors) and better color saturation capacity. It is thus possible to form a high-quality color image with an improved colorimetric gamut by comparison with a printed image for example.

The use of a holographic structure to form the arrangement of pixels is advantageous in that this technique offers greater accuracy of positioning of the pixels and sub-pixels thus formed. This technique in particular makes it possible to avoid overlaps or misalignments between sub-pixels, which improves the overall visual rendering.

The disclosure makes it possible to produce personalized images which are easy to authenticate and resistant to falsification and fraudulent reproduction. The level of complexity and safety of the image which is achieved owing to the disclosure does not come at the expense of the quality of the visual rendering of the image.

Moreover, this disclosure makes it possible to limit the appearance of a color variation effect when the angle of observation or illumination is varied. In particular, the attenuation of this color variation effect can be obtained if the spacing of the opaque black layer with the hologram is relatively low (for example a spacing less than or equal to 100 μm, which may be in a range within 0 μm and 250 μm) and/or if the small thickness of the black layer in certain scenarios of implementation limits this effect. If the spacing between the opaque black layer and the hologram exceeds the value of 250 μm, it can be necessary to significantly increase the size of the pixels of the holographic structure to limit color variations in the hologram, which has the consequence of reducing the resolution of the final image.

Note that in the embodiment described above with reference to FIGS. 5 and 6, the opaque layer 34 is disposed in the multilayer structure 22 such as to be facing the holographic layer 24 which is also part of this multilayer structure 22. As already stated, the opaque layer 22 can be fixed or formed directly on or under the holographic layer 24, or where applicable at least one transparent layer can distinct the opaque layer 22 from the holographic layer 22.

More generally, the production of the secure document 20 (FIG. 4) requires the opaque layer 34 to be able to be positioned facing the holographic layer 24 to reveal, in particular, the dark areas 42 as previously described. On the other hand, it is not obligatory for the opaque layer 34 and the holographic layer 24 to be part of one and the same multilayer structure.

Thus, according to a variant of the embodiment of FIGS. 5 and 6, the holographic layer 24 and the opaque layer 34 are positioned on different parts of the secure document 20, these parts being movable such that the opaque layer 34 can be positioned so that it faces the holographic layer 24 to reveal the dark areas 42 and thus form the personalized image IG.

Thus, the secure document 20 can for example take the form of a book (a passport for example), a first page of which includes the holographic layer 24 and another page includes the opaque layer 34, both pages being movable such that the opaque layer 34 can be positioned so that it faces the holographic layer 24 to reveal the personalized image IG. According to a particular example, the first page includes a transparent window in which the holographic layer 24 is disposed and the opaque layer 34 is positioned on the page adjacent to this first page. In this way, the personalized image IG can be read by reflection with the opaque layer positioned behind, and also by transmission without the use of the black layer. This variant particularly makes it possible insofar as laser perforations are made in the holographic layer and in the opaque layer (hereinafter with reference to FIGS. 13-14), to perform these perforations in different steps which limits interference (perturbations) between the two laser etches (such that the laser perforation of the holographic layer does not affect the opaque layer and conversely). In particular, the physical separation of the holographic layer and of the opaque layer can be advantageous if one wishes to perform these two laser etches separatly since it is in particular possible to use one and the same laser to etch the opaque layer and the holographic layer while avoiding cross-perturbation problems mentioned above.

FIG. 7 is a view having perforations 40 made by means of a laser beam LS1 in the holographic structure 32 as previously described with reference to FIGS. 5-6. In this example, the perforations are of variable sizes, of diameters approximately included between 9 and 35 microns (μm).

Note that the perforations 40 can be arranged in various ways in the holographic layer 24. According to a particular example, it is possible to alter the size of the perforations 40 and/or the number of perforations to obtain a required hole density in certain areas of the arrangement 29 of pixels where one wishes to reveal (or uncover) underlying regions 41 of the opaque layer 34. In particular, the perforations 40 may for example be arranged in a matrix (orthogonal or not)

of rows and columns. According to a particular example, the perforations 40 are of constant diameter. It is by altering the number and position of the holes 40 that the desired shades of color are obtained.

FIG. 8 schematically illustrates the arrangement 29 of pixels 30 in the blank state as described with reference to FIG. 5 (i.e. without the perforations 40), as well as the arrangement 29 of pixels 30 once personalized by the dark or opaque areas 42 such as to reveal the personalized image IG as described with reference to FIG. 6.

FIGS. 9A and 9B illustrate the contribution of the opaque layer 34 present under the arrangement 29 of pixels, in the multilayer structure 22, to produce a personalized image IG.

More particularly, the FIG. 9A shows an example of a personalized image produced according to the concept of the disclosure. In this example, the personalized image is a black and white face of a person. FIG. 9B shows the image obtained, this time without the opaque layer 34 under the arrangement 29 of pixels. As can be seen, the opaque layer 34 provides high contrast in the final image IG and thus substantially improves the image quality.

FIG. 10 shows examples of reliefs 30 of a holographic structure 32, including protrusions and recesses. Various shapes and dimensions of holographic structure are possible within the scope of this disclosure.

Still with reference to FIGS. 5-6, the holographic layer 24 can be coated or assembled with various other layers. Moreover, as already indicated, the holographic layer 24 forms an arrangement 29 of pixels 30. Each pixel 30 includes a plurality of color sub-pixels 31.

FIGS. 11A and 11B show a particular example according to which each pixel 30 includes three sub-pixels 31. The number, shape and more generally the configuration of the pixels and sub-pixels can however vary according to the situation.

An external observer OB can thus view along a particular direction of observation the arrangement 29 of pixels on the basis of light refracted, reflected and/or diffracted from the holographic structure 32 of the holographic layer 24.

More precisely, each pixel 30 is formed by a region of the holographic structure 32 present in the holographic layer 12. It is considered here that the reliefs 30 of the holographic structure 32 (FIGS. 5-6) form parallel rows 34 of sub-pixels, other implementations being however possible. For each pixel 30, its component sub-pixels 31 are thus formed by a portion of a respective row 34, this portion constituting a respective holographic array (or portion of a holographic array) configured to generate a color corresponding to said sub-pixel by diffraction and/or reflection.

In the example envisioned here, the pixels 30 thus include three sub-pixels of distinct colors, other examples being however possible. It is assumed that each sub-pixel 31 is monochromatic. Each holographic array is configured to generate a color in each sub-pixel 31 corresponding to a predetermined angle of observation, this color being modified from a different angle of observation. It is assumed for example that the sub-pixels 31 of each pixel 30 respectively have a distinct fundamental color (for example green/red/blue or cyan/yellow/magenta) according to a predetermined angle of observation.

As shown in FIGS. 11A and 11B, the holographic arrays corresponding to the three rows 34, which form the sub-pixels 31 of one and the same pixel 30, have particular geometric specifications such as to generate a desired distinct color. In particular, the holographic arrays forming the three sub-pixels 31 in this example have a width denoted l and a pitch between each holographic array denoted p.

Thus, according to a particular example where each pixel 30 is composed of four sub-pixels 31, the maximum theoretical saturation capacity S in one of the colors of the sub-pixels in one and the same pixel can be set out in the following way:

$$S = \frac{25}{100} \times \frac{l}{l + p} \quad \text{[Math. 1]}$$

By way of example, it can be considered that l=60 μm and p=10 μm which leads to a maximum theoretical saturation capacity of S=0.21.

It is possible to form the holographic arrays forming the sub-pixels 31 such that the pitch p tends to zero, which makes it possible to increase the maximum theoretical saturation capacity in a color of a sub-pixel (S then tending to 0.25).

According to a particular example, the pitch is set to p=0, which makes it possible to achieve a maximum theoretical saturation capacity S equal to 0.25. In this case, the rows 34 of sub-pixels as represented in FIGS. 11A and 11B are contiguous (no space or white area being present between the rows of sub-pixels.)

The disclosure thus makes it possible to form rows of sub-pixels which are contiguous i.e. adjacent to one another without it being necessary to leave separating white areas between each row, or where applicable keeping separating white areas but of limited dimensions between rows of sub-pixels (with a small pitch p). This particular configuration of the holographic arrays makes it possible to substantially improve the quality of the final image IG (better color saturation) by comparison with conventional image-forming techniques which do not use a holographic structure. This is possible since the formation of holographic structures makes it possible to achieve better accuracy of positioning of the sub-pixels and better uniformity than by conventional printing of the sub-pixels (by offset or other methods).

As already indicated, the arrangement 29 of pixels 30 formed by the holographic layer 24 (FIGS. 5-6) can take different forms. Exemplary embodiments will be described hereinafter.

In general, the arrangement 29 of pixels can be configured such that the sub-pixels 31 are uniformly distributed in the holographic layer 24. The sub-pixels 31 can for example form parallel rows of sub-pixels or else an array in the shape of a hexagon (Bayer type), other examples being possible.

The sub-pixels 31 can for example form an orthogonal matrix.

The pixels 30 can be uniformly distributed in the arrangement 29 of pixels such that the same pattern of sub-pixels 31 repeats periodically in the holographic layer 24.

Moreover, each pixel 30 of the arrangement 29 of pixels can be configured such that each sub-pixel 31 has a single color in said pixel in question. According to a particular example, each pixel 30 in the arrangement 29 of pixels forms an identical pattern of color sub-pixels.

Specific examples of arrangements (or tiling) 29 of pixels which can be implemented in the secure document 20 (FIG. 4) will now be described with reference to FIGS. 12A, 12B and 12C. It should be noted that these implementations are only shown here by way of non-limiting example, many variants being possible, particularly in terms of arrangement and shape of the pixels and sub-pixels, as well as the colors assigned to these sub-pixels.

According to a first example represented in FIG. 12A, the pixels 30 of the arrangement 29 of pixels are of rectangular (or square) shape and include three sub-pixels 31*a*, 31*b* and 31*c* (collectively denoted 31) of distinct colors. As already described with reference to FIGS. 12A-12B, the sub-pixels 31 can each be formed by a portion of a row 34 of sub-pixels. In this example, the tiling 29 thus forms a matrix of rows and columns of pixels 30, orthogonal with respect to one another.

FIG. 12B is a top view representing another example of regular tiling wherein each pixel 30 is composed of three sub-pixels 31, denoted 31*a* to 31*c*, each of a distinct color. The sub-pixels 31 are here of hexagonal shape.

FIG. 12C is a top view representing another example of regular tiling wherein each pixel 30 is composed of four sub-pixels 31, denoted 31*a* to 31*d*, each of a distinct color. The sub-pixels 31 are here of triangular shape.

For each of the arrangement of pixels under consideration, it is possible to adapt the shape and dimensions of each pixel 30 and also the dimensions of the separating white areas present, where applicable, between the sub-pixels, such as to attain the maximum level of saturation in the desired color and the desired level of luminosity.

A multilayer structure 23 will now be described with reference to FIG. 13 according to a particular embodiment. This multilayer structure 23 is performed such as to form a personalized image IG.

The multilayer structure 23 is similar to the multilayer structure 22 previously described with reference to FIGS. 5-6 and mainly differs in that the multilayer structure 23 includes a third layer 50 under the opaque layer 34 and in that the opaque layer 34 includes perforations 52 as described hereinafter.

More precisely, the multilayer structure 23 includes a third layer 50 located facing the opaque layer 34 such that this opaque layer 34 is interposed between the holographic layer 26 and the third layer 50.

The third layer 50 is a transparent layer or of lighter (or brighter) color than the opaque layer 34, such as to form a background for the final personalized image IG.

Furthermore, the opaque layer 34 includes perforations (or holes) 52 formed by a second laser beam LS2 (or laser etching) different from the first laser beam LS1 used to form the perforations 40 in the holographic structure 32. The perforations 52 formed in the opaque layer 34 constitute second perforations within the meaning of the disclosure.

It is here considered that the second perforations 52 constitute regions in which the opaque layer 34 is destroyed or eliminated by the laser perforation effect (formation of holes). In a variant, these second laser perforations 52 do not form holes as such but constitute regions of the opaque layer 34 with altered physical-chemical properties (so-called “photobleaching” technique) by a chemical reaction caused by the laser LS2 such as to modify the response to light of opacifying pigments (for example opacifying black pigments) present in said opaque layer 34. Thus, it is possible to use an opaque layer 34 which includes opacifying pigments which (at least partly) lose their black color under the effect of an appropriate laser beam LS2 (as a function of the wavelength and/or the applied energy density). In this way, lightened areas in the opaque layer 34 can be selectively created by means of the laser beam LS2.

These second perforations 54 are positioned in the extension of a part of the first perforations 40 such that the first and second perforations 40, 52 located face-to-face with one another locally reveal through the holographic structure 32 and the opaque layer 34 lightened areas 56 in the sub-pixels 31, these lightened areas being caused by (corresponding) underlying regions 54 of the third layer 50 located facing these second perforations 52, thus forming a personalized image IG starting from the arrangement 29 of pixels 30 combined with the dark areas 42 and the lightened areas 56.

Thus, in this particular embodiment, only a part—the so-called first part—of the perforations 40 (namely one or a plurality of them) locally reveals through the holographic structure 32 a number of dark (or opaque) areas 42 in the sub-pixels 31 caused by underlying regions 41 of the opaque layer 34 located facing these first perforations 40. Moreover, another part of the perforations 40 (namely one or a plurality of them)—the so-called second part—is located facing, or in alignment with, second respective perforations 54 formed in the third layer 50. The first and second perforations 40, 52 located facing one another thus collectively form through perforations, in the holographic layer 22 and in the opaque layer 34, making it possible to collectively uncover underlying regions 54 of the third background layer 50. These underlying regions 54, uncovered facing second perforations 52, thus produce lightened areas (also called luminous areas or bright areas) 56, from the point of view of an external observer OB in the personalized image IG formed by the combination of the arrangement 29 of pixels 30, dark areas 42 and lightened areas 56.

Note that the size and dimensions of the second perforations 52 can vary according to the situation. Although they are located in the extension of first perforations 40, it is not necessary for the second perforations 52 to have an identical diameter to the first perforations 40 they are facing. It is however necessary for least a part of each second perforation 52 to be positioned facing at least a part of a first corresponding perforation 40 in order to make appear in the personalized image IG an underlying region 54 of the third layer 50.

In the example shown in FIG. 13, the second perforations 52 are through perforations extending through the thickness of the second opaque layer 34 (at the level of the underlying regions 41) such as to reveal, jointly with the first perforations 40 located face-to-face, underlying regions 54 of the third layer 50 at the level of the arrangement 29 of pixels 30. In other words, by making these second perforations 52 by laser in the thickness of the third layer 50, underlying regions 54 of the third layer 50 can be uncovered such as to produce, in all or part of the sub-pixels 31, areas that are lightened with respect to the dark areas 42.

According to a particular example, the lightened areas 56 are areas brighter (or more luminous) than the dark areas 42.

According to a particular example, the color image IG thus produced includes at least one dark or opaque area 42 (revealed by a respective perforation 40) and at least one lightened area 56 (revealed jointly by a perforation 40 and a perforation 52 located face-to-face with one another).

According to a particular example, the first and second perforations 40, 52 are configured such that one or a plurality of first perforations 40 reveal both one (or more) dark area(s) 42 caused by an underlying region 41 of the opaque layer 34 and one (or more) lightened area(s) 56 caused by an underlying region 54 of the third layer 50.

Thus, according to a principle similar to the first perforations 40, the second perforations 52 are arranged such as to select the color of the pixels 30 by modifying the colorimetric contribution of the sub-pixels 31 with respect to one another in at least a part of the pixels 30 formed by the holographic layer 24, such as to reveal the personalized image IG on the basis of the arrangement 29 of pixels, this time combined with the dark areas 42 and the lightened areas 56.

By revealing lightened areas 56 instead of dark areas 42, it is possible to adapt shades of gray (or shades of color) in the pixels 30 by modifying the colorimetric contribution of certain sub-pixels, with respect to one another, in the visual rendering of the final image IG. The creation of the lightened areas 56 in particular makes it possible to lighten at least a part of certain sub-pixels 31.

As already mentioned, it is here assumed that the image IG thus created is a color image resulting from a selective modulation of the colorimetric contributions of color sub-pixels 31. Note however that a personalized image IG can be made in the same way in grayscale, for example by adapting the colors of the sub-pixels 31 accordingly.

As already mentioned above, the laser beam LS2 (also known as "second laser beam") used to form the two perforations (or holes) 52 in the opaque layer 34 is different from the first ray LS1 used to form the first perforations 40 in the holographic structure 32. The first and second laser beams LS1, LS2 may have distinct wavelength spectra. It is thus possible to selectively form perforations in one out of the holographic structure 32 and the opaque layer 34 without perforating the other.

In the example under consideration here, the second laser beam LS2 is a second spectrum of wavelengths SP2 which is at least partly absorbed by the second opaque layer 34 to be able to create the second perforations 52. In other words, the second laser beam LS2 is characterized by a wavelength spectrum SP2 which is at least partly absorbed by the second layer 34. The materials of the third layer 50 are thus chosen accordingly. In particular, since the third layer 50 acts as the backing layer for the opaque layer 34, its features must be chosen such that this third layer 50 keeps is physical or mechanical properties during the etching by means of the lasers LS1 and/or LS2. The composition of the third layer 50 therefore depends on the types and materials of the holographic layer and of the opaque layer as well as the features of the lasers SP1 and SP2 used.

On the other hand, the second spectrum SP2 may be chosen such that the second beam LS2 is not absorbed by the holographic structure 32 (although this variant is possible).

Furthermore, it is considered in this example that the third layer 50 is transparent to the second and third laser beams LS1, LS2. In other words, the third layer 50 does not absorb the laser beams LS1 and LS2 which makes it possible not to affect this background layer when the perforations 40 and 52 are formed.

To form the second perforations 52, it is possible, for example, to use a laser LS2 of YAG type, a blue laser, a UV laser etc. One can moreover apply for example a pulse frequency between 1 kHz and 100 kHz, although other configurations may be envisioned. It is up to those skilled in the art to choose the configuration of the laser beam LS1 according to the specific situation.

By thus using an opaque layer and a background layer of lighter (or brighter) color than the opaque layer, the gamut can be advantageously increased still further, as can the fineness of the personalized image due to the shades of gray thus obtained. A reinforced level of security can also be obtained owing to the increased complexity of the structure overall, while avoiding the use of a laserable layer which, as already explained, generates structural defects (blistering problems).

According to a particular example, the second perforations 52 are formed by projecting the second laser beam LS2 onto the opaque layer 34 at a power less than or equal to a second threshold value above which the blistering effect previously described is liable to occur, which makes it possible to ensure that no air bubbles are generated which are liable to damage the structure 23. Similarly to the first laser beam LS1, this second laser power threshold value is variable and depends on each use case (particularly depending on the type of the hologram and of the opaque layer, and on the characteristics of the laser used). This second threshold value can be determined by those skilled in the art, in particular by an appropriate experimental design which makes it possible to determine the laser power above which the laser generates the destruction of the structure (appearance of bubbles).

Moreover, this disclosure also relates to a manufacturing method for manufacturing a personalized image IG according to any of the previous embodiments described. Also, the different variants and technical advantages described above with reference to the multilayer structures 22 and 23, and more generally to a personalized image in accordance with the concept of the disclosure, are similarly applicable to the manufacturing method of the disclosure to obtain such an image or structure.

A method for manufacturing a color image IG as previously described will now be described with reference to FIG. 14, according to a particular embodiment. It is for example assumed that a color image IG is formed in a document 20 as illustrated in FIG. 4.

During a supplying step S2, a first holographic layer 22 as described above is thus supplied. This holographic layer 32 therefore includes a metal holographic structure 32 forming an arrangement 29 of pixels 30 each including a plurality of sub-pixels 31 of distinct colors. The different features and variants of the holographic layer 22 (including the arrangement 29 of pixels) described above with reference in particular to FIGS. 5-6 are similarly applicable to the manufacturing method.

According to a particular example, the supplying step S2 includes the supplying of a resin underlayer 26 forming the reliefs 30 of a holographic array; and the forming of a metal underlayer 28 on the reliefs 30 of the resin underlayer 26, the metal underlayer 28 having a refractive index greater than that of the resin underlayer (FIGS. 5-6).

The layer 26 (FIG. 4) can for example be a heat-formable layer thus allowing the reliefs 30 of the holographic structure 32 to be formed by embossing on the layer 26 serving as the backing. In a variant, the reliefs 30 of the holographic structure 32 can be produced using a UV curing technique, as already mentioned. These manufacturing techniques being known to those skilled in the art, they will not be described in further detail for the sake of simplicity.

An adhesive and/or glue layer (not shown) can also be used to provide adhesion of the holographic layer 24 on a backing (not shown).

During a positioning step S4, a second layer 34 is positioned (or deposited, or formed) facing the first holographic layer 22, this second layer 34 being opaque to at least the visible wavelength spectrum as already explained. The different features and variants of the opaque layers 24 described above with reference in particular to FIGS. 5-6 are similarly applicable to the manufacturing method.

During a perforating step S6, first perforations (or holes) 40 are formed in the first holographic layer 22 by a first laser beam LS1 (FIG. 6). The first perforations 40 thus occupy all or part of a plurality of sub-pixels 31 of the holographic structure 32. At least a first part of the first perforations 40 locally reveals through the holographic structure some dark (or opaque) areas 42 in the sub-pixels 31, these dark areas being caused (or produced) by underlying regions 41 of the second opaque layer 34 located facing said at least a first part of the first perforations 40, such as to form a personalized image IG starting from the arrangement 29 of pixels combined with the dark areas 42.

Once the step S6 is complete, a multilayer structure 22 is thus obtained as previously described with reference to FIG. 6.

The different features and variants of the first perforations 40 described above with reference in particular to FIGS. 5-6 are similarly applicable to the manufacturing method.

According to a particular example, each first perforation 40 opens onto an underlying region 41 of the opaque layer 34 such as to reveal in the final image IG a number of corresponding dark areas. Variants are however possible as previously described, in which a non-zero part of the first perforations 40 are located facing second perforations 52 fashioned in the opaque layer 34 such as to reveal lightened areas 56 in the arrangement 29 of pixels 30.

As already described, the perforations 40 here are through perforations which extend through the thickness of the holographic structure 32 (and more generally through the thickness of the holographic layer 24) such as to reveal underlying regions 40 of the opaque layer 34 at the level of the arrangement 29 of pixels 30. In other words, by performing these perforations 40 by laser in the thickness of the holographic structure 24, it is possible to uncover underlying regions 41 of the opaque layer 34 such as to produce dark (or opaque) areas 42 in all or part of the sub-pixels 31.

The personalized image IG thus created is a color image resulting from a selective modulation of the colorimetric contributions of color sub-pixels 31. Note however that it is possible to produce in the same way a personalized image IG in gray shades, for example by adapting the colors of the sub-pixels 31 accordingly.

The first laser beam LS1 used in S6 to form the perforations 40 in the holographic structure 32 may be at a first wavelength spectrum SP1 different from the visible wavelength spectrum. To do so, it is possible, for example, to use a YAG laser (1064 nm), a blue laser, a UV laser, etc. It is moreover possible to apply, for example, a pulse frequency between 1 kHz and 100 kHz, although other configurations can be envisioned. It is up to those skilled in the art to choose the configuration of the laser beam LS1 according to the specific situation.

Furthermore, it is necessary for the holographic layer 24 (and more specifically the holographic structure 32) to at least partly absorb the energy delivered by the laser beam LS1 to create the perforations 40 previously described. In other words, the first laser beam LS1 is characterized by a wavelength spectrum SP1 which is at least partly absorbed by the holographic structure 32. The materials of the holographic layer 24 are therefore chosen accordingly.

According to a particular example, the materials forming the holographic structure 32 are selected such that they do not absorb light in the visible spectrum. These can be transparent materials such as those used, in particular, in identity documents. The holographic structure 32 is thus formed out of at least one of the following materials: transparent polycarbonate, PVC, transparent glue etc. In this way, it is possible to create perforations 40 by means of a laser beam LS1 emitting outside the visible spectrum, and to generate a personalized image IG which is visible to the human eye by holographic effect.

However, the spectrum SP1 may be chosen such that the beam LS1 is not absorbed by the opaque layer 34.

Additional layers (not shown), made of polycarbonate or any other appropriate material, may also be applied on either side of the multilayer structure 22 thus obtained (FIG. 6), particularly to protect the assembly. In particular, a transparent layer can thus be applied to the upper face of the holographic layer 24.

As already mentioned, the disclosure makes it possible to work at moderate laser power and thus to form a secure and good-quality personalized image while avoiding generating overheating which would risk producing destructive air bubbles in the structure.

Moreover, as previously described, it is possible to continue the manufacturing method shown in FIG. 14 by performing the steps S10 and S12 described below such as to manufacture, starting from the multilayer structure 22 represented in FIG. 6, the multilayer structure 23 represented in FIG. 13. It is thus possible to form one or more lightened areas 56 in the arrangement 29 of pixels instead of dark areas 42, particularly in order to further improve the quality and security of the personalized image IG thus produced.

According to a particular embodiment, once the forming S6 step is completed, a third layer 50 is thus positioned (or deposited) facing the second opaque layer 34 during a step S10 (FIG. 14) such that this second opaque layer 34 is interposed between the first holographic layer 22 and the third layer 50. This third layer 50, which is transparent or of lighter (or brighter) color than the second opaque layer 34, forms a background with respect to the personalized image IG that one wishes to form.

The different features and variants of the background layer 50 described with reference to FIG. 13 are applicable in a similarly way to the manufacturing method.

During a forming step S12 (FIG. 14), second perforations 52 are formed in the second opaque layer 34 by a second laser beam LS2 different from the first laser beam LS1 used in S6 to form the first perforations 40. The second perforations 40 are positioned in the extension of one or a plurality of first perforations 40 formed in S6 such that the first and second perforations 40, 52 located face-to-face locally reveal through the holographic structure 32 and of the second opaque layer 34 a number of lightened areas 56 in the sub-pixels 31 caused by underlying regions 54 of the third background layer 50 located facing second perforations 52, thus forming a personalized image IG starting from the arrangement 29 of pixels 30 combined with the dark areas 42 and with the lightened areas 56.

The different features and variants of the second perforations 52 described above with reference in particular to FIG. 14 are similarly applicable to the manufacturing method.

It is thus considered in this variant that a non-zero part of the first perforations 40 (for example a first group of first perforations 40) formed in S6 opens onto a respective underlying region 41 of the opaque layer 34 such as to reveal corresponding dark areas 42 in the final image IG, and that another, so-called second non-zero part of the first perforations 52 (for example a second group of first perforations 40) formed in S6 is positioned facing the second perforations 52 such as to reveal, jointly with the second perforations 52, corresponding lightened areas 56 in the final image IG.

As already mentioned above, the second laser beam LS2 used in S12 to form the two perforations (or holes) 52 in the opaque layer 34 is different from the first beam LS1 used in S6 to form the first perforations 40 in the holographic structure 32. The first and second laser beams LS1, LS2 may have distinct wavelength spectra. It is thus possible to selectively form perforations in one out of the holographic structure 32 and the opaque layer 34 without affecting the other.

In the example under consideration here, the second laser beam LS2 is at a second spectrum of wavelengths SP2 which is at least partly absorbed by the second opaque layer 34 to be able to create the second perforations 52. In other words, the second laser beam LS2 is characterized by a wavelength spectrum SP2 which is at least partly absorbed by the second layer 34. As already described, the materials of the third layer 50 are therefore chosen accordingly.

However, the second spectrum SP2 may be chosen such that the second beam LS2 is not absorbed by the holographic structure 32 (although this variant is possible).

Furthermore, it is considered in this example that the third layer is transparent to the first and second laser beams LS1, LS2. In other words, the third layer 50 does not absorb the laser beams LS1 and LS2 which makes it possible not to affect this background layer when the perforations 40 and 52 are formed. Variants are however possible. Thus, the third layer 50 is not necessarily transparent to the laser LS1 and LS2 but the absorption of the beams LS1 and LS2 by this third layer 50 must be low such that its physical integrity (mechanical and color resistance) 50 is conserved.

To form the second perforations 52, it is possible, for example, to use a laser LS2 of YAG type, a blue laser, a UV laser etc. One can moreover apply for example a pulse frequency between 1 kHz and 100 kHz, although other configurations may be envisioned. It is up to those skilled in the art to choose the configuration of the laser beam LS1 according to the specific situation.

Note that the order in which the steps of the manufacturing method represented in FIG. 14 are performed can vary according to the case. Thus, it is for example possible to make the perforations 40 and 52 (steps S6 and S12; FIG. 14) after performing the steps S2, S4, S6 and S10. In the same way, the perforations 40 and 52 can be made (S6, S12) simultaneously in any order.

Those skilled in the art will understand that the embodiments and variants described in this document constitute only non-limiting exemplary implementations of the disclosure. In particular, those skilled in the art may envision any adaptation or combination from among the features and embodiments described above to meet a very specific requirement.

The invention claimed is:

1. A secure document comprising:

a first layer comprising a metal holographic structure forming an arrangement of pixels each including a plurality of sub-pixels of distinct colors; and a second layer positioned facing the first layer, the so-called second layer being opaque to at least the visible wavelength spectrum;

wherein the first layer comprises first perforations formed by a first laser beam, at least a first part of the first perforations locally revealing through the holographic structure a number of dark areas in the sub-pixels caused by underlying regions of the second opaque layer located facing said at least a first part of the first perforations, such as to form a personalized image starting from the arrangement of pixels combined with the dark areas.

2. The document as claimed in claim 1, wherein each pixel of said arrangement of pixels is configured such that each sub-pixel has a single color in said pixel.

3. The document as claimed in claim 1, wherein the first layer comprises:

a resin underlayer forming the reliefs of a holographic array; and a metal underlayer deposited on the reliefs of the resin underlayer, said metal underlayer having a refractive index greater than that of the resin underlayer.

4. The document as claimed in claim 1, wherein the second opaque layer comprises an opaque black surface facing the first layer or comprises opacifying black pigments in its bulk.

5. The document as claimed in claim 1, wherein the first laser beam is at a first wavelength spectrum different from the visible wavelength spectrum.

6. The document as claimed in claim 5, wherein said at least a first part of the first perforations are through perforations which extend through the thickness of the holographic structure such as to reveal said underlying regions of the second opaque layer.

7. The document as claimed in claim 1, comprising a third layer located facing the second layer such that said second layer is interposed between the first layer and the third layer, said third layer being transparent or of lighter color than the second opaque layer, and forming a background for the personalized image, wherein the second layer comprises second perforations formed by a second laser beam different from the first laser beam, the second perforations being positioned in the extension of a second part of the first perforations such that the first and second perforations located face-to-face locally reveal through the holographic structure and through the second opaque layer a number of lightened areas in the sub-pixels caused by underlying regions of the third layer located facing said second perforations, thus forming a personalized image starting from the arrangement of pixels combined with the dark areas and with the lightened areas.

8. The document as claimed in claim 7, wherein the second perforations are through perforations which extend through the thickness of the second layer such as to reveal, jointly with the second part, first perforations located face-to-face, said underlying regions of the opaque third layer through first and second layers.

9. The document as claimed in claim 7, wherein the lightened areas are areas brighter than the dark areas.

10. A method for manufacturing a document, comprising:

supplying a first layer comprising a metal holographic structure forming an arrangement of pixels each including a plurality of sub-pixels of distinct colors;

positioning a second layer facing the first layer, said second layer being opaque to at least the visible wavelength spectrum; and forming, in the first layer, first perforations, by a first laser beam, at least a first part of the first perforations locally revealing through the holographic structure a number of dark areas in the sub-pixels caused by underlying regions of the second opaque layer located facing said at least a first part of the first perforations, such as to form a personalized image starting from the arrangement of pixels combined with the dark areas.

11. The method as claimed in claim 10, wherein the first laser beam is at a first wavelength spectrum different from the visible wavelength spectrum.

12. The method as claimed in claim 10, comprising:

positioning a third layer facing the second layer such that said second layer is interposed between the first layer and the third layer, said third layer being transparent or of lighter color than the second opaque layer, and forming a background for the personalized image, forming, in the second layer, second perforations by a second laser beam different from the first laser beam, the second perforations being positioned in the extension of a second part of the first perforations such that the first and second perforations located face-to-face locally reveal through the holographic structure and through the second opaque layer a number of lightened areas in the sub-pixels, caused by underlying regions of the third layer located facing said second perforations, thus forming a personalized image starting from the arrangement of pixels combined with the dark areas and with the lightened areas.

13. The method as claimed in claim 12, wherein the third layer is transparent to the first and second laser beams.

* * * * *